United States Patent [19]
Lucas et al.

[11] Patent Number: 5,981,648
[45] Date of Patent: Nov. 9, 1999

[54] POLYMERIC CURABLE COMPOSITIONS CONTAINING ALKYLACRYLAMIDOGLYCOLATES

[76] Inventors: Howard Robert Lucas, 16 Grove Pl., Danbury, Conn. 06810; Robert Gerald Lees, 14 Ferris Ave., Norwalk, Conn. 06854; Herbert Burkhard, 13 Lorraine Dr., Eastchester, N.Y. 10709; David Arthur Ley, 130 Fieldcrest Rd., New Canaan, Conn. 06840

[21] Appl. No.: 07/913,126

[22] Filed: Jul. 13, 1992

Related U.S. Application Data

[63] Continuation of application No. 07/473,134, Jan. 30, 1990, abandoned, which is a continuation of application No. 07/044,165, Apr. 30, 1987, abandoned.

[51] Int. Cl.$^6$ ............................... C08K 5/00; C08K 3/00; C08L 33/00
[52] U.S. Cl. ......................... 524/521; 524/555; 525/218; 525/384; 525/386
[58] Field of Search ..................................... 525/218, 221, 525/223, 328.2, 328.4, 381, 382, 384; 524/521, 555

[56] References Cited

U.S. PATENT DOCUMENTS

| | | |
|---|---|---|
| 4,454,301 | 6/1984 | Cady . |
| 4,528,320 | 7/1985 | Ley .......................................... 524/555 |
| 4,778,869 | 10/1988 | Schirmann ............................... 526/304 |

FOREIGN PATENT DOCUMENTS

| | | |
|---|---|---|
| 20000 | 12/1980 | European Pat. Off. . |

OTHER PUBLICATIONS

Encylopedia of Chemical Technolgy.

*Primary Examiner*—Christopher Henderson

[57] ABSTRACT

New and improved curable compositions useful as non-yellowing, acid resistant coatings for a variety of substrates and as adhesives and binders are disclosed. The curable compositions comprise a polymeric component comprising poly($C_1$–$C_6$ alkyl acrylamidoglycolate) functional units and poly (active hydrogen) functional units and preferably an effective amount of a protic acid crosslinking catalyst. In preferred embodiments acid-catalyzed room temperature curable coating compositions are provided. The compositions may be cured effectively at lower temperatures without the use of amines or other toxic crosslinking agents and do not liberate formaldehyde on curing. A method for making poly($C_1$–$C_6$ alkyl acrylamidoglycolate) functional polymers is also disclosed.

4 Claims, No Drawings

POLYMERIC CURABLE COMPOSITIONS CONTAINING ALKYLACRYLAMIDOGLYCOLATES

This is a continuation of application Ser. No. 07/473,134, filed on Jan. 30, 1990 now abandoned, which, in turn, is a continuation of application Ser. No. 07/044,165, filed on Apr. 30, 1987, now abandoned.

BACKGROUND OF THE INVENTION

The present invention relates to new and improved curable compositions adapted for use as coatings, for example, for wood, metal and plastic substrates; for use in, for example, furniture, kitchen cabinets and panelling; in automobiles, appliances, containers and flooring and in business machines; as adhesives for these substrates; and as binders for paper and textiles and non-wovens. More particularly, it relates to compositions comprising a polymer or polymers having alkyl acrylamidoglycolate functionality and active hydrogen functionality.

It has been suggested that incorporation of acrylamido-N-glycolic acid monomers into polymers or copolymers provides products having good solvent resistance. In U.S. Pat. No. 3,422,139, for example, acrylamido-N-glycolic acid, its alkali metal salts and its alkyl esters, are suggested as reticulation agents for polymers and broadly suggests that the reticulated polymers may be used in coating compositions.

In [copending application,] U.S. application Ser. No. 772,592 filed Sep. 5, 1985 and now U.S. Pat. No. 4,656,308, a continuation of application Ser. No. 556,077, filed Dec. 1, 1983, now abandoned, and published as EPO 20,000 on Dec. 10, 1980, crosslinkable coating compositions are disclosed comprising a polymer containing at least two activated ester groups per polymer chain and a compound containing at least two primary or secondary amine groups per molecule. The activated ester groups disclosed include alkyl acrylamidoglycolate alkyl ethers and alkyl acrylamidoglycolates. The amine crosslinked coating compositions are generally quite satisfactory, although they tend to be susceptible to yellowing or acid spotting and therefore may not exhibit a resistance to yellowing and acid spotting which may be desired or required in some applications. Moreover, amines are costly and toxic.

Accordingly, it is an object of the present invention to provide room temperature or low temperature curable compositions which exhibit good solvent resistance and no-formaldehyde evolution upon curing, and which exhibit improved resistance to yellowing and acid spotting under acid attack, which do not require the use of amines.

It is another object of the present invention to provide new and improved curable emulsion and solvent-borne polymeric compositions for use as coatings, adhesives, and as resinous binders for paper and textiles and non-wovens.

SUMMARY OF THE INVENTION

In accordance with these and other objects, the present invention provides curable compositions comprising:

(A) a polymeric component selected from:
  (i) a combination of
    (a) a polymer containing poly ($C_1$–$C_6$ alkyl acrylamidoglycolate) functionality; and
    (b) a polymer or molecule containing poly(active hydrogen) functionality; or
  (ii) a copolymer containing poly($C_1$–$C_6$ alkyl acrylamidglycolate) functionality and poly(active hydrogen) functionality, and said polymer composition comprising from about 1 to about 40 weight percent $C_1$–$C_6$ alkyl acrylamidoglycolate functional units.

As used herein and in the claims by active hydrogen functionality is meant a polymer, copolymer or molecule bearing a pendant active-hydrogen containing functional group and more particularly, those bearing as pendant functional groups, hydroxyl, carboxyl or amide functional groups.

The polymers and copolymers for use herein as component (A) are generally derived from any monoethylenically unsaturated monomers employed in coatings, adhesives and binders. The $C_1$–$C_6$ alkyl acrylamidoglycolate functionality of the polymers or copolymers is contributed by units derived from lower alkyl, e.g. $C_1$–$C_6$, esters of acrylamido or methacrylamido-glycolic acid monomers, such as, for example, methyl acrylamidoglycolate, methyl methacrylamidoglycolate, ethyl acrylamidoglycolate, propyl acrylamidoglycolate and butyl acrylamidoglycolate, to name a few. The active hydrogen functionality of the polymers or copolymers is contributed by units derived from monoethylenically unsaturated monomers bearing pendant hydroxyl, carboxyl or amide groups. Illustrative active hydrogen containing monomers include, for example, hydroxyalkyl acrylates and methacrylates; acrylic acid, methacrylic acid, acrylamide, and methacrylamide, to name but a few. The polymers and copolymers may also comprise units derived from other monoethylenically unsaturated monomers, such as, $C_1$–$C_8$ alkyl esters of acrylic and methacrylic acids, styrene, alpha-methyl styrene, vinyl acetate, vinyl chloride vinylidene chloride, ethylene, butadiene, cyclopentadiene, and acrylonitrile, to name a few. Particularly preferred other monomers for coatings applications include alkyl acrylates and methacrylates, vinyl acetate, hydroxyfunctional methacrylate esters and styrene. Especially preferred coatings will employ alpha-methyl group containing monomers exclusively as the other monomers, such as alkyl methacrylates, to be more particularly described hereinafter. Particularly preferred other monomers for adhesive applications include styrene, butadiene, vinyl acetate and ethylene.

In accordance with the present invention, polymeric component (A) generally comprises from about 1 to about 40 wt % of alkyl acrylamidoglycolate functional units and from about 1 to about 99 wt % of active hydrogen functional units, with any residual wt % being derived from other monoethylenically unsaturated monomers, as defined above. Generally, in polymeric component (A), the weight ratio of alkyl acrylamidoglycolate functional units to active hydrogen functional units is between 5:1 and 1:5, respectively, and preferably between 2:1 and 1:2 respectively. In preferred embodiments, component (A) comprises a copolymer comprising 1 to 40 wt % of units derived from at least one $C_1$–$C_6$ alkyl acrylamidoglycolate, 1 to 60 wt % of units derived from at least one copolymerizable monomer having active hydrogen functionality; and the residual wt % of units being derived from at least one other copolymerizable monoethylenically unsaturated monomer.

In especially preferred embodiments, the residual weight % of units will comprise solely alpha-methyl group containing monomeric units.

Generally and without limitation, the polymers or copolymers for use as component (A) herein have molecular weights of between about 500 and 1,000,000, although polymeric components having higher molecular weights may be employed.

Especially preferred curable compositions of this invention are room temperature curable compositions comprising methyl acrylamidoglycolate units, or butyl acrylamidoglycolate units and hydroxy functional units, to be more fully described hereinafter.

In accordance with preferred embodiments, the present invention provides low or room temperature curable compopositions which additionally comprise, as component (B), a crosslinkingly effective amount of a protic acid crosslinking catalyst. Illustrative acid catalysts for use herein include, for example, p-toluenesulfonic acid, sulfosalycylic acid, sulfuric acid and phosphoric acid to name but a few. Preferred acid catalysts are water soluble sulfonic acids. Stronger acids such as sulfuric are preferred when faster curing times are desired or required. In addition to these acid catalysts, other acids such as carboxylic acids, for example maleic acid or citric acid, may be used in circumstances wherein the coating composition is to be applied on wood, or wherein there is concern about the possibility of corrosion problems with the use of the sulfuric or sulfonic acid types mentioned above.

The acid crosslinking catalyst is added in a crosslinkingly effective amount and generally will be added in an amount of from about 0.05 to about 5.0 parts, preferably 1.0 to 3.0 parts by weight per 100 parts of resin solids.

The new and improved low temperature curable compositions may be provided in emulsion form, as well as in solvent-borne forms, for use as coatings, adhesives or binders. Coatings prepared from the compositions of the present invention are resistant to acid attack. The compositions of this invention also provide excellent low or room temperature curable compositions which avoid the hazards arising in connection with aziridines, isocyanates or formaldehyde liberation associated with earlier prior art curable compositions. In addition, the coatings of this invention do not employ amines which are often toxic, irritating and sensitizing.

The polymeric component(s) may be cured with or without acid catalyst at temperatures from as low as room temperature to about 150° C., the time period of cure being dependent on cure temperature such that longer curing times may be needed at lower temperatures. At higher temperatures of about 100° C. and higher, the compositions may be cured without acid catalyst.

Other objects and advantages of the present invention will become apparent from the following detailed description of the invention together with the illustrative working examples.

DETAILED DESCRIPTION OF THE INVENTION

In accordance with the present invention, new and improved curable compositions are provided, said compositions comprising, as component (A), polymeric materials containing pendant alkyl acrylamidoglycolate moieties and pendant active-hydrogen containing moieties which are crosslinkable at low temperatures, e.g. at temperatures between room temperature and 150° C., in the presence of an acid catalyst, to form cured compositions which are resistant to acid attack or at elevated temperatures without catalyst.

The above-identified crosslinkable moieties may be present on the same or different polymer chains comprising the polymeric component (A). Many variations are possible with the polymeric component (A). For example, component (A) may comprise a combination of two or more polymers, one containing pendant alkyl acrylamidoglycolate functionality, the other containing pendant active hydrogen functionality. Moreover, these two polymers may be of the same or different molecular weight. In the latter case, for example, a relatively high molecular weight polymer containing a plurality of pendant alkyl acrylamidoglycolate groups may be combined with a relatively low molecular weight molecule containing a plurality of active hydrogen functional groups which serves as a crosslinking agent for the high molecular weight polymer and vice-versa.

Generally, and without limitation, effective curing is obtained with a polymeric component (A) which comprises from about 1 to about 40 weight %, based on total solids in component (A) of $C_1$–$C_6$ alkyl acrylamidoglycolate functional units and an amount active-hydrogen containing materials sufficient to provide a mole ratio of $C_1$–$C_6$ alkyl acrylamidoglycolate functional groups to active-hydrogen functional groups of from about 1:5 to about 5:1 in component (A).

The active hydrogen containing materials for use herein in component (A), as has been mentioned above, are preferably polymeric materials possessing pendant hydroxyl, carboxyl and/or amide functional groups. Especially preferred are acrylic polymers possessing active-hydrogen functionality, such as polymers derived in whole or in part from hydroxyalkyl acrylates or methacrylates, acrylic acid, methacrylic acids, acrylamide and methacrylamide monomeric units and mixtures of these units. The active hydrogen materials may also comprise different polymers such as hydroxy-functional polyesters, polymeric polyols, hydroxy functional polyethers and the like.

The active hydrogen functionality of component (A) may also be provided by poly(active hydrogen)-containing monomeric materials. Illustrative monomeric crosslinking agents may include for example: polyols such as alkylene glycols, trimethylol propane, pentaerythritol, dihydroxycyclohexane, glycerol, and the like; di- or polycarboxylic acids, such as oxalic acid, malonic acid, itaconic acid, succinic, adipic, sebacic, phthalic acid, isophthalic acid, terephthalic acid, trimellitic acid and the like; and di- or polyamides, such as oxalamide, malonamide, succinamide, adipamide, sebacamide, and the like.

The alkyl acrylamidoglycolate functionality may be readily incorporated into a vinyl addition polymer for use in component (A) by a number of methods. In the first method, $C_1$–$C_6$ alkyl acrylamidoglycolate monomer or monomers, e.g., units derived from monomers of the formula:

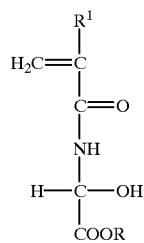

wherein R is $C_1$–$C_6$ alkyl and $R^1$ is hydrogen or methyl are incorporated by adding these monomers to the other monomers of the polymerization reaction mixture and polymerizing them to form a copolymer.

The alkyl acrylamidoglycolate monomers may be prepared by reacting equimolar proportions acrylamide with a $C_1$–$C_6$ alkyl glyoxylate in a polar organic solvent in the presence of an acid catalyst. An elegant method is described in copending U.S. Ser. No. 772,592, filed Sep. 5, 1985, wherein 141.7 parts of acrylamide and 144 parts of methylglyoxylate are admixed in 1200 mls of acetone in the presence of 0.05 parts of phenothiazine and the mixture is heated to reflux for six hours. After filtration and crystallization, 180 parts of methyl acrylamidoglycolate are obtained.

Alternatively, acrylamide monomer can be reacted with a $C_1$–$C_6$ alkyl glyoxylate $C_1$–$C_6$ alkyl hemiacetal, e.g. a compound of the formula:

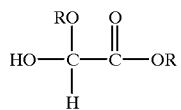

wherein R is $C_1$–$C_6$ alkyl, at a temperature of between about 50° C. and 100° C. for a period of from about 1 to about 5 hours to yield a $C_1$–$C_6$ alkyl acrylamidoglycolate monomer which can then be copolymerized into the polymer. The second method for incorporating the alkyl acrylamidoglycolate units is to first prepare a polymer containing acrylamide units and thereafter react the acrylamide containing polymer with an alkyl glyoxylate alkyl hemiacetal at a temperature of between about 50° to 100° C., preferably 75° C., for a period of from about 1 to about 5 hours, to effectively convert the amide groups to alkyl acrylamidoglycolate units on the polymer. This second method will be more particularly described in the Examples. The polymers for use in Component (A) are readily prepared by emulsion or solvent polymerization techniques well known to those skilled in the art, and more particularly described in the illustrative working examples provided hereinafter.

In accordance with a preferred embodiment, the present invention provides new and improved low or room temperature curable polymeric emulsion compositions for use, for example, in floor coatings, wood coatings, paints, adhesives and as binders for woven or non-woven textiles or paper. In accordance with this embodiment, the new and improved low or room temperature curable polymeric emulsions comprise:

(A) the polymeric component described above additionally comprising an emulsifying agent;

(B) optionally, a crosslinkingly effective amount of a protic acid crosslinking catalyst; and (C) an aqueous medium.

The emulsifying agent employed can be any emulsifying agent employed by those skilled in the art for making a polymer latex and will be added in conventional amounts. A preferred emulsifying agent comprises a monoester of sulfosuccinic acid in isopropyl alcohol, (30%), sold under the trade designation Aeroso® A-102 from American Cyanamid Company.

The emulsion polymers useful for coatings or adhesives applications should contain from about 1 to 25 wt %, preferably from about 2 to 10 wt % of alkyl acrylamidoglycolate functional units. The acid crosslinking catalyst should be water soluble to provide maximum separation from the crosslinkable sites of the polymers contained in the micelles. The curable latexes of this invention are surprisingly stable and cure at low or room temperatures upon evaporation of the aqueous medium.

In another preferred embodiment the present invention provides low or room temperature curable solvent-borne compositions comprising polymeric component (A), crosslinking acid catalyst (B) and an inert organic solvent. The solvent-borne polymeric compositions in accordance with this embodiment are adapted for use as wood coatings, automobile coatings, coil coatings, container coatings, appliance coatings and other metal coatings applications and plastic coatings, such as for business machine housings.

The new and improved low or room temperature curable compositions of the present invention cure to form hardened acid resistant materials at room temperature generally in a period of seven days or less, or at low temperatures with heating up to temperatures of 150° C. in less than about 30 minutes. The compositions of the present invention provide clear, durable, solvent resistant coatings which resist yellowing and spotting under acid attack. The composition cure without the use of hazardous and toxic formaldehyde, isocyanate, aziridine or amine containing materials heretofore employed in low temperature coatings and do not liberate formaldehyde upon curing.

Other objects and advantages of the present invention will become apparent from the following working Examples which are provided for purposes of illustration only, to enable those skilled in this art to better understand and practice the present invention.

EXAMPLES 1–12

In the following Examples a number of emulsion polymer latexes were prepared. Samples of the latexes were combined with acid catalysts or not and the emulsions were drawn down on glass plates and cured to form films.

The emulsion polymer latexes were prepared in accordance with the following general procedures: to a reactor equipped with nitrogen sparge and heat source was charged deionized water, an emulsifying agent, and polymerization initiator. A first monomer charge containing deionized water, emulsifier and monomers was added slowly over a 2 hour period at 65–75° and polymerized. This reaction mixture was held at 70° C. for ½ hour. A second initiator charge comprising deionized water and polymerization initiator was added. A second monomer charge comprising more water, emulsifying agent and additional monomers was then added slowly at 65–70° C. over a 2 hour period and the latex was held at 65–70° C. for one hour and then cooled and filtered. The resulting emulsion polymer latexes all contained 40% solids. Alternatively, a single monomer charge can be used.

More particularly, the emulsion preparation is illustrated by the following method:

To a 500 ml three necked flask equipped with a stirrer, thermometer, reflux condenser, nitrogen sparge tube and heating mantle was added a reactor charge comprising:

| REACTOR CHARGE | Parts by Weight |
|---|---|
| Deionized water | 200.0 |
| Aerosol ® A-102 (30%) | 2.0 |

A first initiator charge comprising 90 parts of deionized water and 2 parts of ammonium persulfate was prepared.

A first monomer mixture was prepared comprising:

| FIRST MONOMER MIXTURE | Parts by Weight |
|---|---|
| Deionized water | 150 |
| Aerosol ® A-102 (30%) | 19 |
| Ethyl acrylate | 97 |
| Methyl methacrylate | 80 |
| Methyl acrylamidoglycolate | 20 |

The reactor was purged with nitrogen for 15 minutes and heated to 65–75° C.

Ten percent of the first monomer mixture and initiator charge were added to the reactor dropwise rapidly at first until initiation was indicated by a blue tinge in the reaction mixture. After initiation had begun the remaining balance of the first monomer mixture and initiator were added dropwise over a 2 hour period. When addition of the first monomer mixture was completed the reaction mixture was held at 70° C. for ½ hour. An initiator charge was prepared comprising 90 parts of deionized water, and 2 parts of ammonium persulfate.

A second monomer charge was prepared comprising:

| SECOND MONOMER CHARGE | Parts by Weight |
|---|---|
| Deionized water | 168.0 |
| Aerosol ® A-102 (30%) | 19.0 |
| Ethyl Acrylate | 97 |
| Methyl Methacrylate | 80 |
| Hydroxyethyl acrylate | 26 |

The initiator charge and the second monomer charge were both added dropwise over a two-hour period. The latex was held at 65–70° C. for 1 hour and then cooled and filtered. The product obtained was 40% solids latex of an emulsion polymer comprising Ethyl Acrylate (48.5 parts)/Methyl Methacrylate (40 parts)/Methyl Acrylamidoglycolate (5 parts)/Hydroxyethyl Acrylate (6.5 parts).

Each of the latexes were prepared in accordance with the same procedures, varying the monomer contents. Prior art emulsion polymers based on N-methylol acrylamide which liberate formaldehyde on curing were prepared and tested for comparison. Also tested were compositions containing either alkyl acrylamidogylcolate functionality or active-hydrogen functionality alone. In addition, otherwise identical compositions were tested with and without acid catalyst for comparison.

Each of the latexes with or without catalyst were drawn down on glass plates and cured under various temperature conditions. Some of the drawn down films were cured at room temperature, e.g. 23±3° C., for a period of four hours. Other films were cured at 100° C. for a period of ten minutes or at 150° C. for five minutes prior to testing.

The cured films were tested for degree of curing and moisture resistance in accordance with standard testing procedures. Degree of curing was tested by examining the swelling characteristics of a test sample of the film in a methyl ethyl ketone (MEK) solvent. More particularly, MEK swelling was determined by cutting a portion of the free films into square samples measuring 1.25 cm on a side and immersing the test sample in MEK solvent at room temperature for a period of four hours. Thereafter, each sample was remeasured for surface area. MEK swelling values were determined in accordance with the equation MEK swelling=(swollen area/original area). More completely crosslinked or cured films will take up less solvent and swell less than only partially crosslinked films. In accordance with this test method, therefore, higher MEK swelling values indicate incomplete cure and lower values indicate a higher degree of crosslinking, e.g. better curing. A reported value of D meant the film dissolved indicating little or no crosslinking and F meant the film fragmented, also indicating a low degree of curing.

Many of the films were also tested for moisture resistance by immersing samples of the free films in a water bath at room temperature for a four hour period and examining the samples for hazing effects. Film appearance after water immersion is reported according to the following scale: C=clear, which meant no hazing was observed; S.O=slightly opaque, which meant hazing was clearly apparent; O=opaque, which meant that hazing was severe; O.R.=opaque-recovers, which meant that clarity of the sample returned as the water evaporatd; and V.S.=very slightly effected, which meant there was a small amount of hazing such that the sample could not be considered clear, but exhibited less hazing than S.O. samples.

The emulsion polymer coating compositions prepared and the test results obtained are set forth in TABLE 1 as follows:

TABLE I

| EMULSION POLYMER SYSTEMS | | | | | | |
|---|---|---|---|---|---|---|
| EXAMPLE | A | B | C | D | 1 | 2 |
| Polymer Composition: | | | | | | |
| ethyl acrylate | 54 | 54 | 54 | 53.5 | 52.5 | 52.5 |
| methyl methacrylate | 43 | 43 | 43 | 43 | 42 | 42 |
| N-methylol acrylamide | 3 | 3 | — | — | — | — |
| methyl acrylamidoglycolate (MAG) | — | — | — | 3.5 | 3.0 | 3.0 |
| butyl acrylamidoglycolate (BAG) | — | — | — | — | — | — |
| hydroxyethyl acrylate | — | — | 3 | — | — | — |
| acrylamide | — | — | — | — | 2.5 | 2.5 |
| Emulsion, % Polymer Solids | 40% | 40% | 40% | 40% | 40% | 40% |
| Acid Catalysts, wt % of emulsion resin solids | | | | | | |
| p-toluenesulfonic acid | — | 2 | 2 | 2 | — | 2 |
| sulfuric acid | — | — | — | — | — | — |
| phosphoric acid | — | — | — | — | — | — |
| Cured Film Properties: | | | | | | |
| Room Temperature Cure, 4 hrs. | | | | | | |
| MEK Swelling | 4.5 | 2.6 | D | F | 5.4 | 5.8 |
| Water Immersion | — | — | 0 | S.O. | — | — |
| 100° C. Cure, 10 minutes | | | | | | |
| MEK Swelling | 3.4 | 2.1 | F | 5.8 | — | — |
| Water Immersion | — | — | 0 | S.O | — | — |

TABLE I-continued

| 150° C. Cure, 5 minutes | | | | | | |
|---|---|---|---|---|---|---|
| MEK Swelling | 3.1 | 2.1 | 11.3 | 4.7 | 4.0 | 4.0 |
| Water Immersion | — | — | 0 | 0 | — | — |

| EXAMPLE | 3 | 4 | 5 | 6 | 7 | 8 |
|---|---|---|---|---|---|---|
| Polymer Composition: | | | | | | |
| ethyl acrylate | 51 | 51 | 51.5 | 51.5 | 48.5 | 48.5 |
| methyl methacrylate | 40.5 | 41.0 | 41.0 | 41.0 | 40 | 40 |
| N-methylol acrylamide | — | — | — | — | — | — |
| methyl acrylamidoglycolate (MAG) | 3.5 | 3.5 | — | — | 5.0 | 5.0 |
| butyl acrylamidoglycolate (BAG) | — | — | 3.5 | 3.5 | — | — |
| hydroxyethyl acrylate | 5.0 | 5.0 | 4.0 | 4.0 | 6.5 | 6.5 |
| acrylamide | | | | | | |
| Emulsion, % Polymer Solids | 40% | 40% | 40% | 40% | 40% | 40% |
| Acid Catalysts, wt % of emulsion resin solids | | | | | | |
| p-toluenesulfonic acid | — | 2 | 1 | 2 | — | 2 |
| sulfuric acid | — | — | — | — | — | — |
| phosphoric acid | — | — | — | — | — | — |
| Cured Film Properties: | | | | | | |
| Room Temperature Cure, 4 hrs. | | | | | | |
| MEK Swelling | F | 4.0 | F | 4.8 | 6.2 | 3.1 |
| Water Immersion | | C | V.S | S.O | C | C |
| 100° C. Cure, 10 minutes | | | | | | |
| MEK Swelling | F | 3.1 | 3.8 | 2.8 | 6.2 | 2.6 |
| Water Immersion | | C | S.O | V.S | C | C |
| 150° C. Cure, 5 minutes | | | | | | |
| MEK Swelling | 3.7 | 2.6 | 3.4 | 2.4 | 5.0 | 2.1 |
| Water Immersion | | C | 0 | C | C | C |

| EXAMPLE | 9 | 10 | 11 | 12 |
|---|---|---|---|---|
| Polymer Composition: | | | | |
| ethyl acrylate | 48.5 | 48.5 | 45 | 45 |
| methyl methacrylate | 40 | 40 | 37.5 | 37.5 |
| N-methylol acrylamide | — | — | — | — |
| methyl acrylamidoglycolate (MAG) | 5.0 | 5.0 | 10.0 | 10.0 |
| butyl acrylamidoglycolate (BAG) | — | — | — | — |
| hydroxyethyl acrylate | 6.5 | 6.5 | 7.5 | 7.5 |
| acrylamide | | | | |
| Emulsion, % Polymer Solids | 40% | 40% | 40% | 40% |
| Acid Catalysts, wt % of emulsion resin solids | | | | |
| p-toluenesulfonic acid | — | — | — | 2 |
| sulfuric acid | 1.1 | — | — | — |
| phosphoric acid | — | 1.1 | — | — |
| Cured Film Properties: | | | | |
| Room Temperature Cure, 4 hrs. | | | | |
| MEK Swelling | 3.7 | 5.0 | 3.7 | 3.4 |
| Water Immersion | C | C | — | — |
| 100° C. Cure, 10 minutes | | | | |
| MEK Swelling | 2.1 | 3.1 | 4.0 | 2.8 |
| Water Immersion | C | C | — | — |
| 150° C. Cure, 5 minutes | | | | |
| MEK Swelling | 2.1 | 2.1 | 3.7 | 2.1 |
| Water Immersion | C | C | — | — |

The data of Table 1 generally show that the compositions of this invention shown in Examples 1–12 provided good curing with and without acid catalysis. Examples A and B represent prior art N-methylol acrylamide crosslinked compositions, with and without an acid catalyst, respectively. The acid catalyzed composition shown in Example B, exhibited good curing characteristics even at room temperature, however the compositions of Examples A and B both have a tendency to liberate formaldehyde on curing, rendering them unsuitable for use in the home, or in paper or textiles or in non-woven binders due to toxicity hazards. Example C shows the results obtained for an emulsion polymer containing active-hydrogen functionality provided by hydroxyethyl acrylate units alone, but without any alkyl acrylamidoglycolate functionality. The composition of Example C did not effectively cure under the conditions tested. Example D shows a composition containing alkyl acrylamidoglycolate functionality alone and no active hydrogen functionality in the polymeric component (A). Examples 1 and 2 show the results obtained with a composition comprising a polymeric component containing MAG and acrylamide as the active hydrogen component, without and with an acid catalyst, respectively. The results show that crosslinking does occur when acrylamide is the active hydrogen source. Examples 3 and 4 demonstrate compositions of this invention, with and without acid catalyst, respectively. The non-catalyzed composition of Example 3 cured at elevated temperatures whereas the acid-catalyzed composition of Example 4 provided a cured film exhibiting good moisture resistance and good degree of curing, even after curing at room temperature for only four hours. A comparison of Examples 2 and 4 shows that hydroxyl groups are more effective as an active hydrogen source than amide groups. Examples 5 and 6 show compositions of this invention wherein the alkyl acrylamidoglycolate functionality is provided by butyl acrylamidoglycolate functionality. Examples 5 and 6 exhibited good properties on curing at temperatures above room temperature. Example 6 is better than Example 5 due to higher acid concentrations. A comparison of Examples 7 and 8–10 shows that acid catalyzed compositions, Examples 8–10, exhibit improved curing properties, over a non-catalyzed composition of Example 7, using three different acid catalysts although Example 7 exhibited good curing properties as well. Comparison of Examples 3 to 4 and 11 to 12 also shows that crosslinking is better with acid catalysis. With increasing concentrations of crosslinkable moieties, as shown in Examples 11 and Example 12, better curing properties are obtained, with the acid catalyzed composition of Example 12 again showing significantly better results over the non-catalyzed identical composition of Example 11. The data of Table 1 show that MAG and BAG containing coatings are curable at room temperature and higher temperatures to form water- and solvent-resistant coatings.

EXAMPLES 13–29

In the following Examples, solvent-borne polymer compositions were prepared and the compositions were formulated, cured and tested for coatings properties. Some of the solvent-borne polymers were directly polymerized to incorporate alkyl acrylamidoglycolate moieties into the polymers and other acrylamide-containing solvent-borne polymers were post-reacted with alkyl glyoxylate alkyl hemiacetals to provide polymers possessing alkyl acrylamidoglycolate functionality.

Preparation of Solvent-Borne Polymers A, B and C

Polymers A, B, and C were prepared from the following recipes:

SOLVENT-BORNE POLYMER PREPARATION

| Ingredient; parts by weight | Polymer A | Polymer B | Polymer C |
|---|---|---|---|
| (1) n-Butanol | 40 | 40 | 56.4 |
| (2) Toluene | 60 | 60 | 84.7 |
| (3) Ethanol | 50 | 50 | 70.6 |
| (4) Methyl Acrylamidoglycolate (MAG) | 25 | 25 | — |
| (5) Butyl Acrylamidoglycolate (BAG) | — | — | 45.2 |

-continued

SOLVENT-BORNE POLYMER PREPARATION

| Ingredient; parts by weight | Polymer A | Polymer B | Polymer C |
|---|---|---|---|
| (6) Methyl Methacrylate | 42 | 49 | 53.7 |
| (7) Lauryl Methacrylate | 18 | — | 23.1 |
| (8) Butyl Acrylate | — | 23.5 | — |
| (9) Hydroxyethyl Methacrylate | 15 | — | 19.1 |
| (10) Acrylic Acid | — | 2.5 | — |
| (11) t-Butyl Peroctoate | 2 | 2 | 2.8 |
| (12) n-Dodecanethiol | 1.5 | 1.5 | 2.1 |

For Polymers A and B, ingredients 1–10 were placed in a 500 ml. three-necked flask equipped with a stirrer, thermometer, reflux condenser, nitrogen sparge tube and heating mantle. The contents of the flasks were sparged with nitrogen for 15 minutes. The reaction mixture was heated to reflux (82° C.) whereupon the t-butyl peroctoate initiator, and n-dodecanethiol chain transfer agent were added. The ensuing polymerization reaction was continued at 82° C. for a period of 10 hours. Polymer C was prepared in a similar manner except that the reactor flask was first purged with nitrogen for 15 minutes, and a preformed mixture of ingredients 1–3; 5–7; 9; and 11–12 were added dropwise while heating to 82° C. over a three hour period. The polymerization reaction mixture was heated at 82° C. for another four hours.

Preparation of Methyl Glyoxylate Methyl Hemiacetal

In a suitable reaction flask equipped with stirrer, heating mantle, condenser and vacuum take off were charged 950 grams (6.42 moles) of a 50% solution of glyoxylic acid in water and 3255 grams (10.1 moles) of methanol. The mixture was stripped of 450 grams of water/methanol by heating to 65° C. under 26" of vacuum. Thereafter, 825 grams more of methanol was added together with 16 grams of AMBERLYST® 15 catalyst (available from Rohm & Haas Company). The mixture was heated to 72° C. and held at that temperature for a period of three hours, after which the temperature was lowered to 30° C. and a 26" of vacuum applied. The temperature was then raised to 65° C. to remove 825 grams of a water/methanol mixture.

Once again 825 grams more of methanol were added and the mixture heated to and held at 72° C. for three hours. Thereafter, the temperature was lowered to 30° C. and 26" of vacuum applied. Again the temperature was raised to 65° C. to remove 825–875 grams of methanol. The AMBERLYST® catalyst was removed by filtration. Analysis of the product showed 90% methyl glyoxylate methyl hemiacetals, e.g.

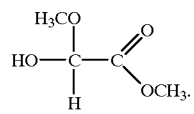

Preparation of Butyl Glyoxylate Butyl Hemiacetal

In a suitable reactor flask equipped with stirrer, heating mantle, Dean Stark trap, condenser, nitrogen inlet, vacuum take off and dropping funnel were added 1980 grams (13.0 moles) of 50% glyoxylic acid in water and 1215 grams (16.4 moles) of n-butanol. The contents of the flask were heated to 80–85° C. under nitrogen sparge and vacuum to remove approximately 760 grams of an n-butanol/water azeotrope. Thereafter, an additional 1210 grams of n-butanol were added and strip distillation continued until no water was seen in the azeotrope. An additioral 810 grams of n-butanol were then added and the mixture refluxed for two hours at 80–85° C. under vacuum, followed by vacuum stripping of excess n-butanol. Product weight was 2850 grams.

Preparation of Polymer D

In a 500 ml flask equipped with stirrer, thermometer, condenser, nitrogen sparge tube, dropping funnel and heating mantle were charged 10 grams of toluene and 6.6 grams of ethanol. The contents of the flask were sparged with nitrogen for 20 minutes while heating to reflux at 82° C. Thereafter, the following charge:

| Ingredient | Weight, in grams |
| --- | --- |
| Toluene | 89.6 |
| Ethanol | 59.8 |
| Acrylic Acid | 5.0 |
| Acrylamide | 20.5 |
| Butyl Acrylate | 70.0 |
| Methyl Methacrylate | 54.6 |
| Styrene | 15.9 |
| 1-Dodecanethiol | 1.669 |
| Tert.-Butyl Peroctoate | 3.32 | was added from the dropping funnel over a five hour period. Heating was continued under a nitrogen blanket at 82° C. for an additional 12 hours to provide a solvent-borne polymer equalling 52% solids.

Preparation of Polymer E

In a 500 ml flask equipped with stirrer, thermometer, condenser, nitrogen sparge tube, monomer feed pump and heating mantle were charged 10.2 grams of toluene and 6.8 grams of ethanol. The contents of the flask were heated to reflux (82° C.) while sparging with nitrogen. After 30 minutes, a solution of the following:

| Charge | Weight, in grams |
| --- | --- |
| Toluene | 91.8 |
| Ethanol | 61.2 |
| Acrylic Acid | 5.1 |
| Acrylamide | 25.5 |
| Butyl Acrylate | 68.0 |
| Methyl Methacrylate | 54.4 |
| Styrene | 17.0 |
| 1-Dodecanethiol | 1.7 |
| Tert.-Butyl Peroctoate | 3.4 | was pumped in over a 5½ hour period. After addition, the mixture was heated at reflux under nitrogen for an additional 12 hours to provide a polymer solution equalling 52% solids.

Preparation of Polymer F

To a similarly equipped 500 ml flask were charged 20.4 grams of ethanol and 30.6 grams of toluene. The contents of the flask were sparged with nitrogen for 20 minutes and heated to reflux (82° C.). Thereafter, addition of the following solution was begun:

| Charge | Weight, in grams |
| --- | --- |
| Ethanol | 47.6 |
| Toluene | 71.4 |
| Acrylamide | 25.5 |
| Butyl acrylate | 93.5 |
| Methyl Methacrylate | 34.0 |
| Styrene | 17.0 |
| 1-Dodecanethiol | 1.7 |
| Tert.-Butyl Peroctoate | 3.4 |

The addition was complete in 6½ hours. After addition was complete, the solution was heated at reflux for another 12 hours to provide a solution polymer equalling about 51.8% solids.

Preparation of Polymer G

Another solution polymer containing directly copolymerized methyl acrylamidoglycolate units was prepared as follows:

To a similarly equipped flask were charged 6 grams of ethanol and 20 grams of toluene. The contents of the flask were sparged with nitrogen for 20 minutes and then heated to reflux (82° C.). On reaching reflux, the addition of a solution of the following charge was begun:

| Charge | Weight, in grams |
| --- | --- |
| Ethanol | 119 |
| Toluene | 40 |
| Acrylic Acid | 3.2 |
| Methyl Acrylamidoglycolate | 28.2 |
| Butyl Acrylate | 47.5 |
| Methyl Methacrylate | 75.8 |
| 1-Dodecanethiol | 1.9 |
| Tert.-Butyl Peroxyisobutyrate | 1.9 |

The addition required three hours and thereafter, heating was continued an additional 3½ hours to provide a solution of 49.3% solids.

Preparation of Polymer H 10.2 grams of toluene and 6.8 grams of ethanol were charged to a 500 ml flask equipped as in the foregoing preparations. The contents of the flask were sparged with nitrogen for 30 minutes and thereafter heated to reflux (82° C.). On reading reflux, the following charge was begun:

| Charge | Weight, in grams |
| --- | --- |
| Toluene | 91.8 |
| Ethanol | 61.2 |
| Acrylic Acid | 5.1 |
| Acrylamide | 34.0 |
| Butyl Acrylate | 59.9 |
| Methyl Methacrylate | 54.4 |
| Styrene | 25.5 |
| 1-Dodecanethiol | 1.7 |
| Tert.-Butyl Peroctoage | 3.4 |

The addition of the charge required 5 hours. After the addition was complete, heating at reflux was continued for 12 hours to provide a polymer solution of 54% solids.

Preparation of Polymer I

In a one liter flask equipped with stirrer, thermometer, condenser, nitrogen sparge tube, monomer feed pump and heating mantle, wer charged 61.2 grams of toluene and 40.8 grams of ethanol. The contents of the flask were sparged with nitrogen and heated to 82° C. After 20 minutes, addition of the following solution was begun:

| Charge | Weight, in grams |
|---|---|
| Ethanol | 95.2 |
| Toluene | 142.8 |
| Acrylamide | 51.0 |
| Hydroxyethyl Acrylate | 51.0 |
| Butyl Acrylate | 136.0 |
| Methyl Methacrylate | 68.0 |
| Styrene | 34.0 |
| 1-Dodecanethiol | 3.4 |
| Tert.-Butyl Peroctoate | 6.8 |

The monomer solution was added over a period of 3½ hours. After addition was complete, the reaction mixture was heated for another 6½ hours. Dry solids were 51.8%.

Coating solutions were prepared from Polymers D, E, F, H and I by reacting the indicated amount of the polymer with the specified amount of either methyl glycolate methyl hemiacetal or butyl glycolate butyl hemiacetal, as indicated, in toluene at a temperature of between about 65° to about 80° C., preferably at 75° C., for a period of time sufficient to convert the acrylamide units of the polymer into MAG or BAG units, generally in from 1 to 3 hours and preferably for 2 hours.

In some of the following Examples, a commercially available hydroxy functional acrylic resin product, ACRYLOID® AT-400, was added as a supplemental active-hydrogen containing polymeric material in Component A. ACRYLOID® AT-400 is available from Rohm and Haas Company and has a viscosity of between 5,000 and 9,000 cps, an acid number of 28 and an hydroxyl number of 86.

Curable compositions were prepared by admixing the polymeric components prepared above with an acid catalyst or with either a diamine crosslinker or without catalyst for comparison. In the comparative examples employing a diamine crosslinker, the diamine used was 4,7-dioxodecane-1,10-diamine. Methyl ethyl ketone was added to these formulations in the relative proportions specified for pot life.

The curable compositions comprising polymeric components and crosslinking catalyst were drawn down on either BONDRITE® 100 brand cold rolled steel test panels or on Alodine S1200 aluminum panels using a Bird Bar with a 3 mil gap. The drawn down films were cured under the conditions of time and temperature indicated to form cured test panels.

The test panels were evaluated for film properties in accordance with standard test methods. The films were evaluated for degree of curing by an MEK Rub test wherein MEK rubs values indicate the number of double rubs the test panel could withstand by rubbing the sample at constant force with an MEK saturated cloth until the film rubbed off. In those Examples for which the MEk rub values are expressed as a fraction, the numerator indicates the number of double rubs it took to mar the surface of the coating and the denominator indicates the number of rubs until 50% of the film had been rubbed off. The test panels were subjected to 200 rubs or until premature failure of the coating was noted. An MEK rub value of "200+" indicates that after 200 rubs the film still had not been rubbed off.

Some of the test panels were evaluated for surface hardness in accordance with the Knoop Indentation Hardness Test, ASTM D 1474, where a load is applied to the surface of the coating by means of a pyramidal shaped diamond having specified face angles and thereafter convering the measurements of the resultant permanent impression to a hardness number.

Some of the test panels were evaluated for film hardness in accordance with the Pencil Test, ASTM D 3363. In accordance with this method a pencil held firmly against the film sample at a 45° angle is pushed away from the operator in a ¼-inch wide stroke. The process is started with the hardest pencil and continued down the scale of hardness until the pencil which does not cut into or gouge the film is identified. The Hardness scale from hard to soft is as follows: 3H-2H-H-F-HB-B-2B-3B. The results are reported as the pencil hardness number of the pencil which did not cut or gouge into the coating.

Some of the Examples were evaluated for surface gloss at 20° and 60° using a Gardiner Gloss Meter in accordance with standard methods.

In addition, some of the samples were evaluated for moisture resistance by the water immersion methods described in Examples 1–8, by immersion in water for 24 hours at 40° C. in accordance with ASTM D 870 and others had this property measured in accordance with the Cleveland Humidity Resistance test, ASTM D 2247, after 72 hours of exposure to controlled humidity conditions at 38° C.

Coating compositions containing methyl acrylamidoglycolate units were prepared and the test results obtained are set forth in TABLE 2. The designation MGMH indicates methyl glyoxylate methyl hemiacetal. The coatings formulations for Examples 15, 16, 19 and 20 were prepared by reacting the acrylamide containing polymers indicated with methyl glyoxylate methyl hemiacetal as follows:

EXAMPLE 15—20 grams of polymer F were reacted with 2.82 grams of methyl glyoxylate methyl hemiacetal prepared above for 2 hours at 75° C. before adding crosslinking catalyst.

EXAMPLE 16—20 grams of polymer F were reacted with 1.41 grams of methyl glyoxylate methyl hemiacetal prepared above for two hours at 75° C. before adding catalyst.

EXAMPLE 19—20 grams of polymer I were reacted with 2.9 grams of methyl glyoxylate methyl hemiacetal prepared above for two hours at 75° C. before adding catalyst.

EXAMPLE 20—20 grams of Polymer I were reacted with 1.45 grams of methyl glyoxylate methyl hemiacetal prepared above for two hours at 75° C., before adding catalyst.

Coatings properties were as follows:

TABLE 2

| METHYL ACRYLAMIDOGLYCOLATE CONTAINING SOLVENT-BORNE COATINGS | | | | | | | | | | | | |
|---|---|---|---|---|---|---|---|---|---|---|---|---|
| EXAMPLE | 13 | 14 | E | 15 | 16 | 17 | 18 | F | 19 | 20 | 21 | 22 |
| Composition, pbw | | | | | | | | | | | | |
| Polymer A | — | — | — | — | — | 25 | 25 | 25 | — | — | — | — |
| Polymer B | — | 25 | 25 | — | — | — | — | — | — | — | 25 | 25 |
| Polymer F | — | — | — | 20 | 20 | — | — | — | — | — | — | — |
| Polymer G | 15 | — | — | — | — | — | — | — | — | — | — | — |

TABLE 2-continued

METHYL ACRYLAMIDOGLYCOLATE CONTAINING SOLVENT-BORNE COATINGS

| EXAMPLE | 13 | 14 | E | 15 | 16 | 17 | 18 | F | 19 | 20 | 21 | 22 |
|---|---|---|---|---|---|---|---|---|---|---|---|---|
| Polymer I | — | — | — | — | — | — | — | — | 20 | 20 | — | — |
| ACRYLOID ® AT400 | — | — | — | — | — | — | — | — | — | — | 17.8 | 17.8 |
| MGMH | — | — | — | 2.82 | 1.41 | — | — | — | 2.9 | 1.45 | — | — |
| Crosslinker or Catalyst | | | | | | | | | | | | |
| p-TSA, % on polymer solids | 0.1 | 2.0 | — | 1.0 | 1.0 | — | 2.0 | — | 0.11 | 0.11 | 2.0 | 4.0 |
| Diamine/MEK, pbw | — | — | 1.42/2.33 | — | — | — | — | 1.37/2.24 | — | — | — | — |
| PROPERTIES: | | | | | | | | | | | | |
| MEK Rubs, T° C./Time | | | | | | | | | | | | |
| Room Temp/7 days | — | 70 | 70 | — | — | 50/150 | 200+ | 200+ | — | — | 6 | 6 |
| 60°/20 minutes | — | — | — | 10 | 12 | — | — | — | 12 | 12 | — | — |
| 80°/20 minutes | — | — | — | 11 | 12 | — | — | — | 20 | 15 | — | — |
| 100°/10 minutes | — | 100/200+ | 75 | — | — | 200+ | 200+ | 200+ | — | — | 20 | 37 |
| 100°/20 minutes | — | — | — | 200 | 30 | — | — | — | 200 | 200 | — | — |
| 125°/20 minutes | 35 | — | — | 200 | 200 | — | — | — | 200 | 200 | — | — |
| 150°/5 minutes | — | 100/200+ | 66 | — | — | 200+ | 200+ | 200+ | — | — | 123 | 120 |
| 150°/20 minutes | 20 | — | — | — | — | — | — | — | — | — | — | — |
| 175°/20 minutes | 200 | — | — | — | — | — | — | — | — | — | — | — |
| KNOOP HARDNESS | | | | | | | | | | | | |
| Room Temp/7 days | — | 4.9 | — | — | — | 11.5 | 12.7 | 10.4 | — | — | 1.2 | 1.2 |
| 100°/10 minutes | — | 9.2 | 10.5 | — | — | 10.6 | 10.7 | 10.0 | — | — | 1.3 | 1.2 |
| 150°/5 minutes | — | 13.2 | 12.0 | — | — | 12.7 | 14.4 | 12.2 | — | — | 3.8 | 4.9 |
| Pencil HARDNESS | | | | | | | | | | | | |
| RT/7 days | — | F | H | — | — | F | H | F | — | — | 2B | 2B |
| 100°/10 minutes | — | H | H-2H | — | — | H | 2H | H-2H | — | — | 2B | 2B |
| 15°/5 minutes | — | 3H | 2H-3H | — | — | H-2H | 3H | 2H | — | — | H | H |
| Surface Gloss, 20° | | | | | | | | | | | | |
| Room Temp/7 days | — | 87 | 81 | — | — | 55 | 86 | 83 | — | — | 73 | 47 |
| 100°/10 minutes | — | 86 | 87 | — | — | 83 | 87 | 87 | — | — | 87 | 71 |
| 150°/5 minutes | — | 87 | 87 | — | — | 86 | 88 | 89 | — | — | 72 | 26 |
| Surface Gloss, 60° | | | | | | | | | | | | |
| Room Temp/7 days | — | 95 | 91 | — | — | 91 | 96 | 93 | — | — | 94 | 85 |
| 100°/10 minutes | — | 95 | 94 | — | — | 96 | 96 | 95 | — | — | 97 | 93 |
| 150°/5 minutes | — | 95 | 93 | — | — | 96 | 96 | 94 | — | — | 93 | 73 |
| WATER IMMERSION | | | | | | | | | | | | |
| Room Temp/7 days | — | — | S.O. | — | — | 0 | O. | O.R. | — | — | O. | O. |
| 100°/10 minutes | — | O.R. | O. | — | — | 0 | O.R. | O.R. | — | — | O.R. | O.R. |
| 150°/5 minutes | — | O.R. | O. | — | — | 0 | V.S. | O. | — | — | O.R. | O.R. |

The data of TABLE 2 demonstrate the improved coatings obtained in accordance with the present invention. Examples 13, 14, E, 16 and 20 all show MAG containing acrylic polymers which also contain either acrylamide or acrylic acid units as the active hydrogen source. Example 13 did not cure well except at elevated temperatures probably because of a combination of low active hydrogen content coupled with low amount of acid catalyst. A comparison of Examples 14, 15 and 16 with Example E shows that the acid catalyzed coatings of Examples 14, 15 and 16 cured generally better and at lower temperatures than the diamine cured coating of Example E. These data demonstrate that the acid catalyzed systems of this invention provide an improvement over the amine cured systems of the prior art without the use of toxic or harmful crosslinking agents.

Examples 17, 18, F and 19–22 all show coating compositions comprising a polymer component containing MAG units and hydroxyl units, as the active hydrogen source. A comparison of Examples 17 and 18 demonstrate that effective room temperature curing is obtained with the acid catalyzed composition of Example 18 above, although even the uncatalyzed composition of Example 17 will cure effectively at elevated temperatures of 100° C. and above. A comparison of Examples 18 and F demonstrates again that the acid catalyzed coating of Example 18 provided slightly better hardness properties than the amine cured composition of Example F. Examples 19 and 20 demonstrate that the MAG and OH containing polymers prepared by the post reaction hemiacetal route also provide curable coating compositions which cure effective at temperatures below 150° C. Examples 21 and 22 demonstrate the results obtained with compositions within the scope of this invention wherein the polymeric component contains a MAG containing polymer and a second polymer containing OH functionality. A comparison of Examples 18, 19 and 20 and Examples 21 and 22 demonstrates that acid catalyzed compositions comprising a copolymer containing both MAG units and OH units on the same polymer backbone (Examples 18, 19 and 20) provides better results than a composition wherein the MAG units and active hydrogen units are provided on different polymer chains. Moreover, a comparison of Examples 17 and 18 versus Example 19 also demonstrates that a copolymer containing MAG units and wherein both the OH units and the other copolymerizable units are all alpha-methyl group containing monomer units as shown by Examples 17 and 18 provided the best low temperature curing performance. The similar polymer of Example 19 containing fewer alpha-methyl group containing monomers did not cure as rapidly or as effectively at lower and room temperatures as compared with Examples 17 and 18. Example 18 demonstrated superior performance properties over all of the compositions tested and illustrates the most preferred embodiment of the present invention.

EXAMPLES 23–28

In the following Examples, solvent-borne polymer coating compositions containing butyl acrylamidoglycolate units as the alkyl acrylamidoglycolate functionality were prepared and tested in accordance with the methods of Examples 13–22. Some of the polymers were prepared by reacting acrylamide containing polymers with butyl glyoxylate butyl hemiacetal (BGBH) and others were prepared by directly copolymerizing butyl acrylamidoglycolate monomers into the copolymer. More particularly, coating compositions prepared by the hemiacetal route were prepared as follows:

EXAMPLE 23—38.5 grams of polymer D, prepared above, were reacted with 3.6 grams of butyl glyoxylate butyl hemiacetal, prepared above, in 4.9 grams of toluene for a period of two hours at 75° C.

EXAMPLE 23—38.5 grams of polymer D and 7.2 grams of butyl-glyoxylate butyl hemiacetal were reacted in 8.4 grams of toluene at 75° C. for a period of 2 hours.

EXAMPLE M—20 grams of polymer E prepared above and 5.4 grams of butyl glyoxylate butyl hemiacetal were reacted at 75° C. for 2 hours. The polymer solution was cooled to 25° C. and 0.03 grams of an amine catalyst, DABCO®, a 1,4-Diaza-bicyclo[2.2.2]octane were added.

EXAMPLE N—same as for Example M except that 10.9 grams of butyl glyoxylate butyl hemiacetal were used.

EXAMPLES 25 and 26—38. 9 grams of polymer H, prepared above, were reacted with 5.8 grams and 11.7 grams of butyl glyoxylate butyl hemiacetal prepared above, respectively, for 2 hours at 75° C., then cooled before 0.03 grams of p-toluene sulfonic acid (p-TSA) were added to each, respectively.

EXAMPLE 27—29 grams of polymer F, prepared above, were mixed with 6.6 grams of butyl glyxyolate butyl hemiacetal prepared above, and 0.05 grams of p-TSA were added.

The solvent-borne polymer coating compositions were used to make drawn down films which were cured and tested as in Examples 13–27.

The compositions prepared and the results obtained, are set forth in TABLE 3, as follows:

TABLE 3

| BUTYL ACRYLAMIDOGLYCOLATE CONTAINING SOLVENT-BORNE COATINGS | | | | | | | | |
|---|---|---|---|---|---|---|---|---|
| EXAMPLE | 23 | 24 | M | N | 25 | 26 | 27 | 28 |
| Composition, pbw | | | | | | | | |
| Polymer D | 38.5 | 38.5 | — | — | — | — | — | — |
| Polymer E | — | — | 20 | 20 | — | — | — | — |
| Polymer H | — | — | — | — | 38.9 | 38.9 | — | — |
| Polymer F | — | — | — | — | — | — | 29 | — |
| Polymer C | — | — | — | — | — | — | — | 25 |
| BGBH | 3.6 | 7.2 | 5.4 | 10.9 | 5.8 | 11.7 | 6.6 | — |
| Crosslinker or Catalyst, wt % | | | | | | | | |
| p-TSA | — | — | — | — | .02 | .06 | .14 | 0.5 |
| DABCO | — | — | 0.1 | 0.1 | — | — | — | — |
| PROPERTIES: | | | | | | | | |
| MEK Rubs, at ° C./Time | | | | | | | | |
| Room Temp/7 days | — | — | — | — | — | — | — | 200+ |
| 60°/20 minutes | 24 | 20 | 100 | 50 | 34 | 14 | 3 | — |
| 70°/20 minutes | 27 | 21 | — | — | 60 | 34 | — | 200+ |
| 80°/20 minutes | 31 | 25 | 200 | 200 | 59 | 43 | 8 | 200+ |
| 100°/10 minutes | — | — | — | — | — | — | — | 200+ |
| 100°/20 minutes | 100 | 100 | 200 | 200 | 26 | 200 | 200 | — |
| 125°/20 minutes | 200 | 200 | 200 | 200 | 200 | 200 | 200 | — |
| 150°/5 minutes | — | — | — | — | — | — | — | 200+ |
| KNOOP HARDNESS | | | | | | | | |
| Room Temp/7 days | | | | | | | | 9.5 |
| 100°/10 minutes | | | | | | | | 8.0 |
| 15°/5 minutes | | | | | | | | 12.2 |
| SURFACE GLOSS, 20°/60° | | | | | | | | |
| Room Temp/7 days | | | | | | | | 61/84 |
| 100°/10 minutes | | | | | | | | 75/94 |
| 125°/10 minutes | | | | | | | | 75/95 |
| 150°/5 minutes | | | | | | | | 82/96 |
| CLEVELAND HUMIDITY RESISTANCE | | | | | | | | |
| Room Temp/7 days | | | | | | | | 0 |
| 100°/10 minutes | | | | | | | | 0 |
| 125°/10 minutes | | | | | | | | 62/87 |
| 150°/20 minutes | | | | | | | | 76/90 |

The data of TABLE 3 demonstrate that BAG containing coatings are curable at elevated temperatures without catalyst, with diamine catalyst and with acid catalyst. The amine cured coatings of Examples M and N exhibited good curing but suffer from the drawbacks associated with the use of amines mentioned above, i.e., toxicity and handling problems and as will be demonstrated hereinafter, the amine cured systems have poor resistance to yellowing and acid spotting under acid attack.

Example 28 demonstrates the superior results obtained with the preferred embodiment of this invention. Example 28 illustrates an acid catalyzed coating composition comprising a copolymer containing both BAG units and hydroxyl units and except for the BAG units all other units are derived from alpha-methyl group containing monomers. Only the composition of Example 28 exhibited good room temperature curing properties.

EXAMPLE 29

In the following Example, coating formulations comprising the solvent-borne polymer A, prepared above, and containing the acid catalyst of this invention, or either a diamine crosslinker or no catalyst, were tested for yellowing resistance and resistance to acid attack in accordance with standard testing methods.

More particularly, the coating compositions were tested for yellowing resistance in accordance with ASTM E 313 test procedures. In this method the coatings were drawn down on steel panels and cured at either room temperature for 7 days or at 100° C. for 20 minutes. Thereafter, the yellowness index was determined in accordance with ASTM E313, by instrumental determination of yellowness using a colorimeter equipped with an amber, green and blue source-filter-photo-detector combination. From amber reflectance value (A), the green reflectance value (G) and Blue reflectance value (B), yellowness index values were calculated. The higher the yellowness index number the more yellowing discoloration was developed by the sample during curing.

The test samples were also evaluated for acid spotting resistance in accordance with the following method: Aqueous solutions of HCl at concentrations of 0.5%, 1.0%, 2.0%, and 4.0% were prepared. A few drops of each of acid solutions were placed at discrete locations on the cured coated steel panel and covered with a watch glass. The acid treated panels were thereafter baked in an oven at 80° C. for a period of 30 minutes. The acid was removed by water washing and the panels were visually examined for effects of acid attack. Acid spotting resistance observations are reported according to the following legend:

C=Cracking of the coating was present
Bl=Blisters were formed in the coating
Br=Browning of the coating occurred
W=Whitening of the coating occurred.
R=Rusting of the steel panel occurred.
S=Surface only
L=light
H=heavy effect
T=trace effect
NE=no effect The acid spotting tests were performed on several panels each originally cured under differing conditions of cure time and temperature. The coatings prepared and the test results obtained are reported in TABLE 4 as follows:

TABLE 4

YELLOWNESS INDEX AND ACID RESISTANCE OF MAG SOLVENT-BORNE COATINGS

| EXAMPLES | 17 | 18 | F |
|---|---|---|---|
| COMPOSITION | | | |
| POLYMER A | 25 | 25 | 25 |
| wt % p-TSA | — | 2.0 | — |
| Diamine/MEK, pbw | — | — | 1.37/2.24 |
| PROPERTIES: | | | |
| YELLOWNESS INDEX | | | |
| Room Temp/7 days | 0.029 | 0.014 | 0.148 |
| 100° C./20 minutes | 0.076 | 0.090 | 0.676 |
| ACID SPOTTING RESISTANCE | | | |
| Room Temp/7 days | | | |
| 0.5% | LBr, S | LBr, S | HBr, B1, R |
| 1.0% | LBr | LBr, S | HBr, B1, R |
| 2.0% | LC | C | HBr, B1, R |
| 4.0% | WC | C, R | HBr, B1, R |
| 100°/10 minutes | | | |
| 0.5% | W, S | W,S | HBr, B1, R |
| 1.0% | W, S | Br,S | HBr, B1, R |
| 2.0% | C | Br,S | HBr, B1, R |
| 4.0% | C | C | HBr, B1, R |
| 150°/5 minutes | | | |
| 0.5% | NE | T | HBr, B1, R |
| 1.0% | LBr | T | HBr, B1, R |
| 2.0% | WS | T | HBr, B1, R |
| 4.0% | LB1, LC | NE | HBr, B1, R |

As shown by the data of TABLE 4, only the compositions of this invention shown in the compositions of Examples 17 and 18, exhibited good resistance to yellowing and good resistance to acid spotting under acid attack. The amine cured composition of Example F was clearly inferior to the compositions of this invention with respect to the acid-catalyzed Example 18 and also to the non-catalyzed composition of Example 17.

Although the present invention has been described with reference to certain preferred embodiments, modifications or changes may be made therein by those skilled in this art. For example, instead of MAG and BAG being used as the alkyl acrylamidoglycolate functional unit, ethyl or propyl acrylamidoglycolate units may be substituted. Instead of acrylic or methacrylic acid esters, other mono-ethylenically unsaturated monomers, such as styrenic monomers may be incorporated into the polymer(s) of component (A). Moreover, instead of a hydroxy-functional acrylic resin as a supplemental active-hydrogen containing polymer, other active hydrogen containing polymers, such as hydroxy functional polyesters or amine/epoxy adduct resins may be included. All such obvious modifications may be made by those skilled in this art without departing from the scope and spirit of the present invention, as defined by the appended claims.

What is claimed is:

1. A curable latex composition comprising an emulsion in an aqueous medium of:
 (i) (a) a polymer containing poly($C_1$–$C_6$ alkylacrylamidoglycolate) functionality and
 (b) a polymer or compound containing poly(active hydrogen) functionality or
 (ii) a copolymer containing poly($C_1$–$C_6$ alkylacrylamidoglycolate) functionality and poly (active hydrogen) functionality,
 said polymers (i) and (ii) comprising from about 1 to about 40 weight percent of said $C_1$–$C_6$ alkylacrylamidoglycolate functional units, with the proviso that said active hydrogen functionality is not provided by an amine.

2. A composition as recited in claim 1 wherein said poly(active hydrogen) functionality is provided by hydroxyl groups.

3. A composition according to claim 1 further comprising a non-amine-containing crosslinking catalyst.

4. A composition according to claim 1 comprising an emulsion in an aqueous medium of a copolymer containing poly($C_1$–$C_6$ alkylacrylamidoglycolate) functionality and poly(active hydrogen) functionality, said copolymer comprising from about 1 to about 40 weight percent of said $C_1$–$C_6$ alkylacrylamidoglycolate functional units, with the proviso that said active hydrogen functionality is not provided by an amine.

* * * * *